US006862093B2

(12) United States Patent
Peng et al.

(10) Patent No.: US 6,862,093 B2
(45) Date of Patent: Mar. 1, 2005

(54) RUGGEDIZED FORENSIC LIGHT SOURCE

(75) Inventors: Ge Peng, Beijing (CN); Zhong Leiming, Beijing (CN)

(73) Assignee: Horiba Jobin Yvon Inc., Edison, NJ (US)

( * ) Notice: Subject to any disclaimer, the term of this patent is extended or adjusted under 35 U.S.C. 154(b) by 275 days.

(21) Appl. No.: 10/034,274

(22) Filed: Dec. 28, 2001

(65) Prior Publication Data

US 2002/0126287 A1 Sep. 12, 2002

Related U.S. Application Data

(60) Provisional application No. 60/259,192, filed on Dec. 29, 2000.

(51) Int. Cl.[7] .............................. G01N 21/25; F21V 9/00; F21L 4/00
(52) U.S. Cl. ....................... 356/418; 356/417; 362/208; 362/293; 362/187; 250/458.1; 250/504 H
(58) Field of Search ................................ 356/418, 417, 356/318, 416; 362/187, 109, 208, 183, 293, 294, 280, 282, 551; 250/458.1, 504 H, 461.1; 359/887–893

(56) References Cited

U.S. PATENT DOCUMENTS

| 4,123,172 A | 10/1978 | French |
| 4,454,568 A | 6/1984 | Stadnik |
| 4,613,931 A | 9/1986 | Messinger |
| 4,800,474 A | * 1/1989 | Bornhorst ................... 362/293 |
| 4,907,133 A | 3/1990 | Nath |
| 4,933,816 A | * 6/1990 | Hug et al. ................... 362/551 |
| 5,003,434 A | 3/1991 | Gonser et al. |
| 5,099,399 A | 3/1992 | Miller et al. |
| 5,109,461 A | 4/1992 | Churchill |
| 5,243,410 A | 9/1993 | Larson et al. |
| 5,515,162 A | * 5/1996 | Vezard et al. ................ 356/318 |
| 5,581,356 A | * 12/1996 | Vezard ........................ 356/418 |
| 5,613,752 A | 3/1997 | Vezard |
| RE37,136 E | 4/2001 | Vezard |
| 6,407,864 B1 | * 6/2002 | Kappel et al. ............... 359/599 |

FOREIGN PATENT DOCUMENTS

JP 5151807 6/1993

* cited by examiner

Primary Examiner—Layla G. Lauchman
(74) Attorney, Agent, or Firm—Kirkpatrick & Lockhart LLP; Anthony H. Handal

(57) ABSTRACT

A forensic light source uses a pair of filter wheels to achieve a combination of the characteristics of filters on different wheels and may include a housing which supports the light, filter wheels and other parts with shock absorbing members such as rubber washers or the like to achieve a shock resistant housing. A light source and a plurality of light filters are contained within the housing. The light source is powered by an external power supply, thus making the light source light weight.

30 Claims, 12 Drawing Sheets

RUGGEDIZED FORENSIC LIGHT SOURCE

CROSS REFERENCE TO RELATED APPLICATIONS

This application claims the priority of U.S. provisional patent application No. 60/259,192 filed Dec. 29, 2000, the disclosure of which is hereby incorporated herein by reference thereto.

TECHNICAL FIELD

The present invention relates to light sources useful for illuminating and thus detecting the presence of forensic materials at a crime scene using light of wavelengths selected to enhance the likelihood of detecting such materials.

REFERENCE TO GOVERNMENT FUNDING

Not Applicable.

BACKGROUND OF THE INVENTION

Description of Related Art

Recent advances in DNA testing have rendered the gathering of forensic materials of increasing importance. However, even before the advent of DNA testing, the detection of forensic materials such as blood, perspiration, bone, skin, and the like has always been of great importance to crime fighters. For example, bone fragments that can be matched to a corpse would show that the individual who had suffered the crime may have been at a particular location. Fingerprints would identify individuals because of their unique characteristic. Loose hairs on a victims clothes could identify a possible assailant.

But as important as forensic evidence was in the past, it was only one of numerous circumstantial and objective sources of evidence which were weighed by juries and judges in their search for the truth and implementation of criminal justice objectives aimed at punishing and/or preventing criminal activities.

However, with the advent of DNA Testing, forensic material begins to approach, more closely than ever, a determination with certainty respecting certain types of criminal activity and particularly reliable circumstantial evidence with respect to other types of criminal activity. For example, in rape cases, identification of seminal fluids substantially amounts to a basis to convict or a basis to acquit. This is especially the case where only the victims and the accused have their DNA patterns in the sample.

Accordingly, the detection of forensic materials at a crime scene is of the utmost importance whether to make an almost positive connection between a criminal and a crime scene or to exonerate innocent people. One of the primary tools in detecting forensic materials is the use of light having particular wavelength characteristics. More particularly, a light that is produced by various types of forensic light sources which include means to direct the light onto various parts of a crime scene. One typical device, for example, comprises a light source and a six foot long fiber optic member which directs light from the light source to a point in which the end of the fiber optic member is pointed. A wheel containing a number of filters is mounted at the end of the fiber optic light pipe. In order to select various wavelengths, the wheel is rotated thus interposing different filters in front of the output of the light pipe. The result is that the filters filter the light as it comes out of the light pipe and allow only the light of a particular wavelength to fall on an object or area to be illuminated. Such devices are relatively heavy and the long fiber optic light pipe is of particular advantage because it allows the light source to be put down on the floor and the light direction and source to be manipulated to the manipulation of the very light and easy to manipulate fiber optic bundle light type. This is what represents one of the easiest to use instruments and, a particularly effective embodiment of a forensic light source. However, the bundles necessary for such a device are relatively expensive and the use of a plurality of filters results in a particularly large expense. Moreover, the fiber optic bundle is also a relatively expensive item and contributes significantly to the cost. In addition, losses occur during transmission along the fiber optic bundle and, accordingly, light sources of especially high strength are needed to provide sufficient illumination energy at the output of the light bundle and filters.

However, such systems are relatively expensive to manufacture. In addition, the filter assembly is at the end of a relatively fragile fiber optic bundle and both the filter assembly and fiber optic bundle are subject to abuse and shock, and need to be protected.

Other approaches suffer from even greater problems. For example, in one system, an array of filters located in a housing which contains the light source are operated by remote control using an electrical switch located at the end of the light pipe opposite the light source and filters. The result is the need for an electrical connection and electrical control circuitry for activating additional motor systems needed to move the filters. This has the result of decreasing reliability and system life, while at the same time increasing the cost of the system.

SUMMARY OF THE INVENTION

In accordance with the present invention, a forensic light source is provided which combines the easy maneuverability of a simple fiber optic bundle without the use of a fiber optic bundle while at the same time preserving the flexibility of control with the same hand that is moving the light source. In addition, the relatively light weight nature of the system which is encountered by the hand used to scan the crime scene is also maintained. Moreover, the same is achieved without the high cost of an electrical control circuitry to control placement of filters as source. In addition, these objects are achieved in a format which is particularly resistant to shock and abuse. Finally, all the above advantages and objects of the invention are achieved in a configuration which allows low cost and also provides for compounding filtering characteristics to achieve versatility in the operation of the system.

In accordance with the present invention, these objectives are achieved in the context of a system which comprises a light source contained within a housing. The housing includes a handle attached to the housing which allows the housing to be grasped by a user. Light is output from the housing through a filter wheel mounted on the housing. The filter wheel is positioned to allow for filter adjustment using the thumb of the hand which is grasping the housing while the other four fingers engage the handle to hold the housing in position. The same is achieved by having the filter wheels mounted in front of the output of the light source within the housing which is grasped by the hand. At the same time, power to the system is supplied not by an internal battery pack or internal power supply incorporating a transformer. Rather, a power supply or battery pack is coupled by a cable to the housing containing the light source. During use, the power supply is placed on the floor and the light source, relatively light because of the absence of the power supply components, is manipulated to direct light wherever one wishes to direct light. Likewise, when a battery pack is used, the battery pack is also coupled by a long wire to the housing of the inventive forensic light source. The result is that the weight of the battery pack is also kept off the hand doing the work of directing the light source in various directions.

BRIEF DESCRIPTION OF THE DRAWINGS

The advantages, and the system and apparatus of the present invention will be understood from the following description taken together with the drawings, in which.

DETAILED DESCRIPTION OF THE PREFERRED EMBODIMENT

Figure 1:
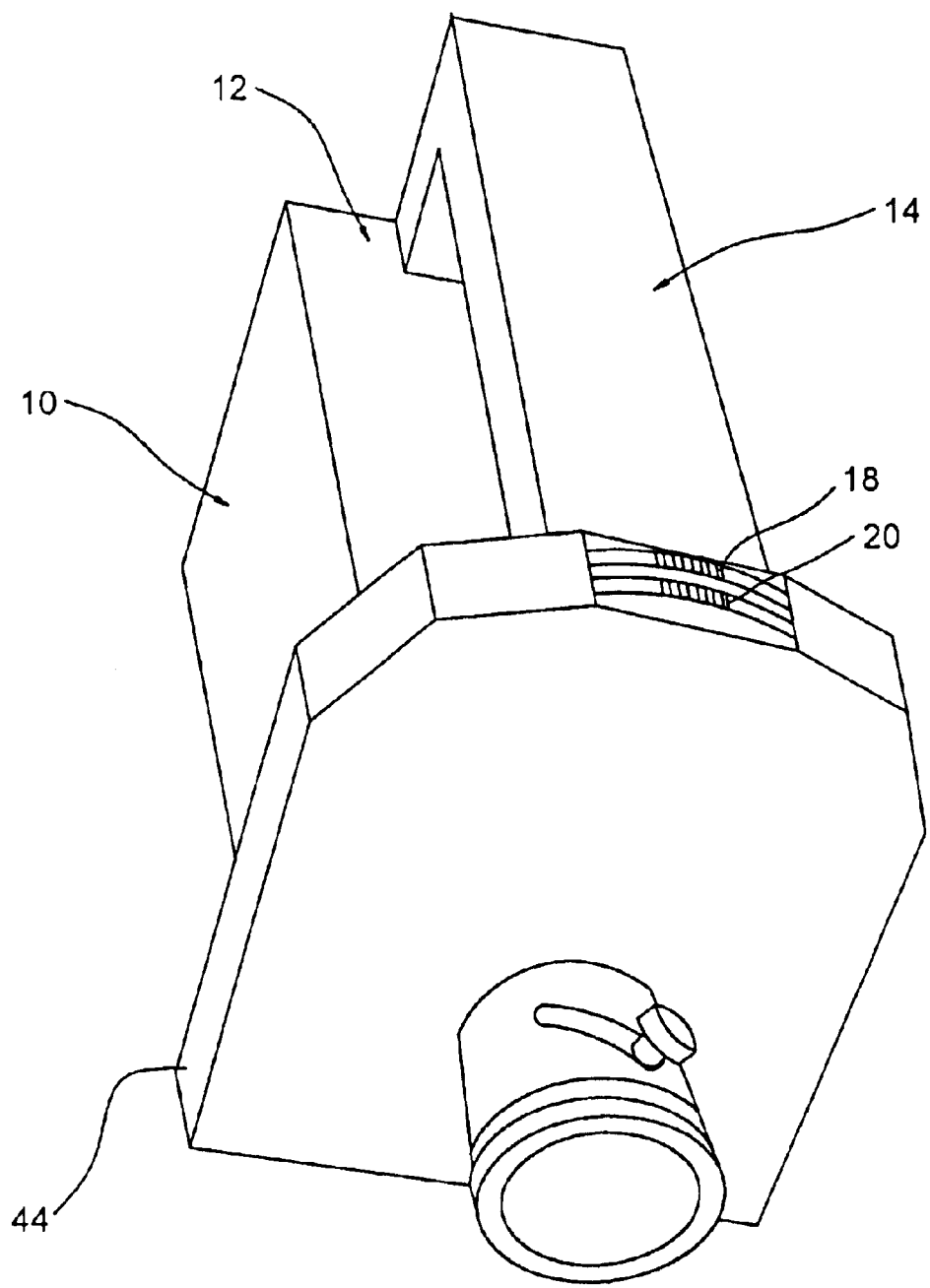
FIG. 1 is a front view taken from above of an embodiment of a forensic instrument constructed in accordance with the present invention.
Figure 2:
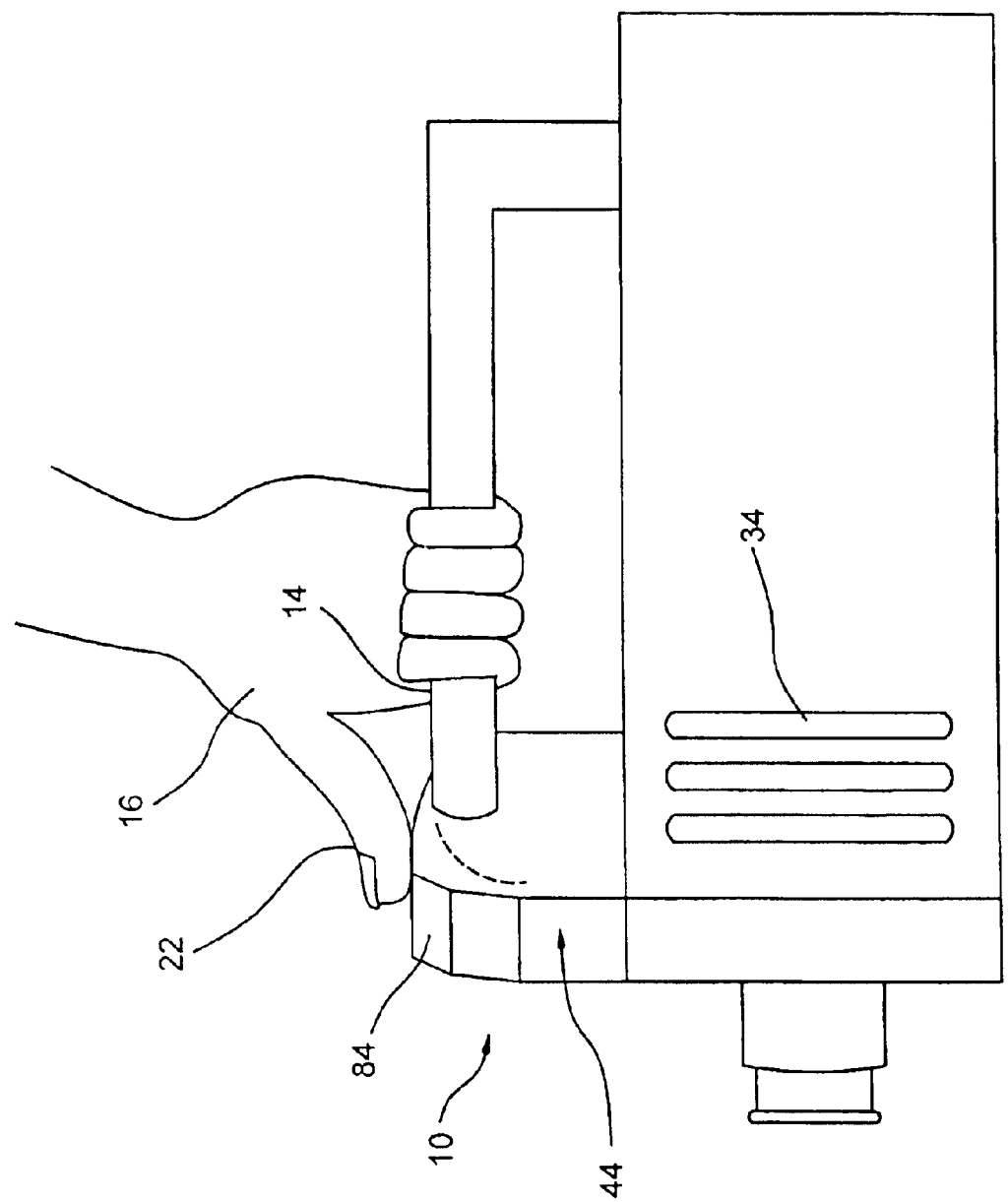
FIG. 2 is a side view of the embodiment of the present invention in FIG. 1 illustrating a preferred grip position during use of the inventive instrument.

Referring to FIG. 1, the inventive forensic light source 10 is illustrated. Forensic light source 10 includes a housing 12 which may be grasped by the user using a handle 14. More particularly, as illustrated in FIG. 2, the user uses a unit by grasping handle 14 with his hand 16. The unit is controlled by a pair of frequency selector dials 18 and 20 (FIG. 1). The user positions his hand 16 in such a manner that thumb 22 on hand 16 may be placed over dials 18 and 20 and the thumb may be selectively used to rotate either dial 18 or dial 20 to a desired position.

Figure 3:
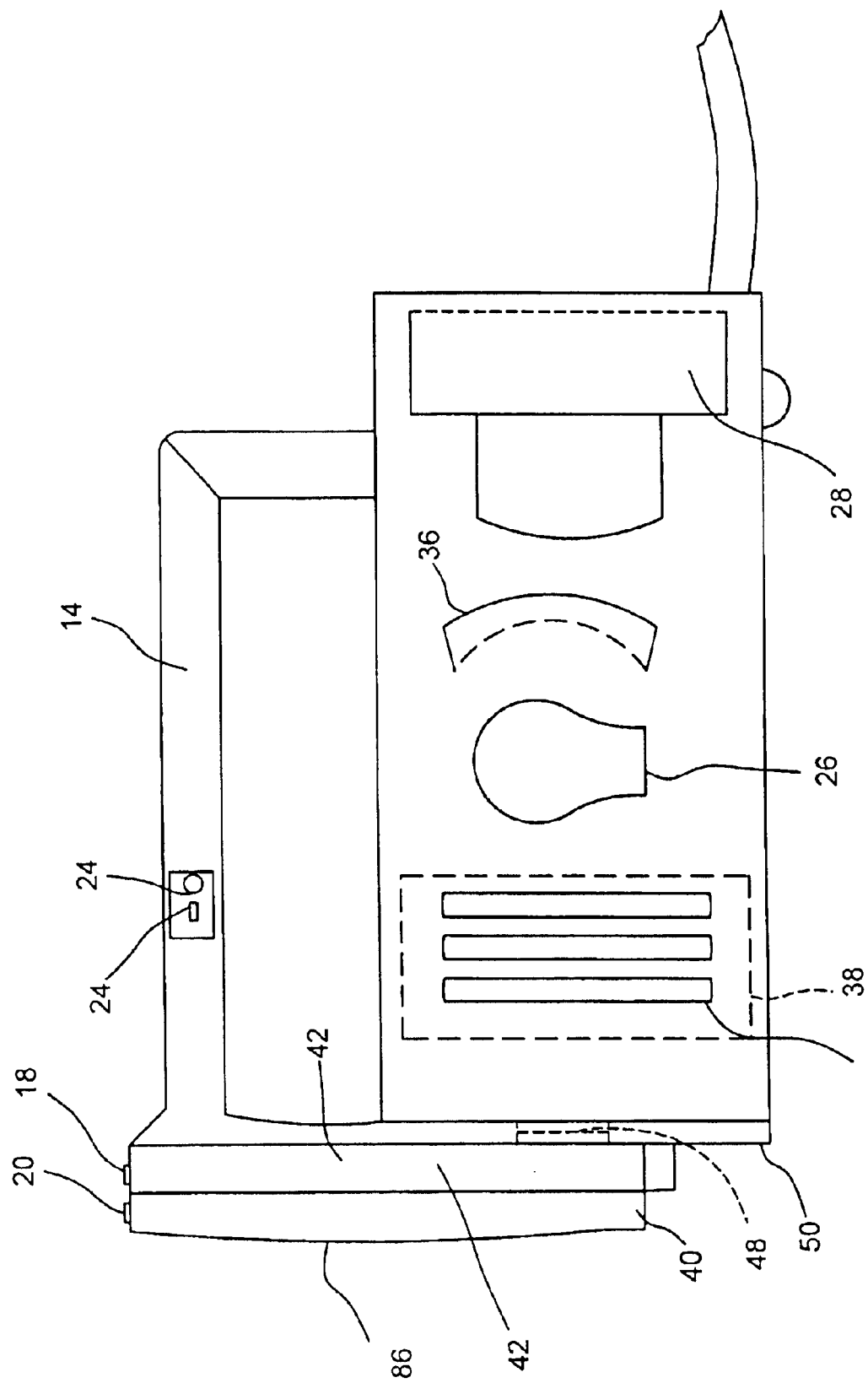
FIG. 3 is a side view of the embodiment of the present invention in FIG. 1.
Figure 4:
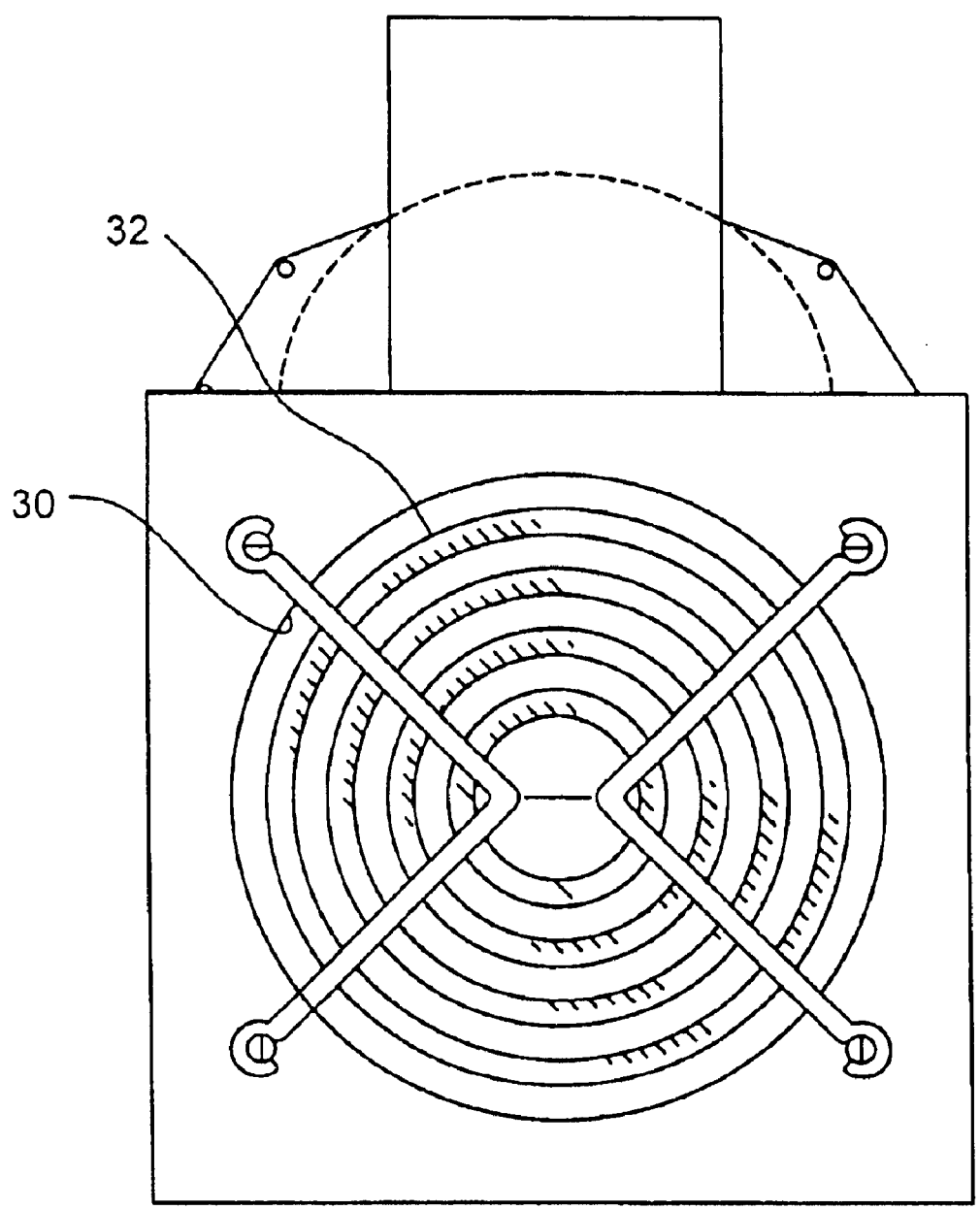
FIG. 4 is a rear view of the embodiment of the present invention in FIG. 1.

Referring to FIG. 3, handle 14 on housing 12 includes an on/off switch 24. Switch 24 is used to turn a light source such as lamp 26 on and off. Lamp 26, which may be mounted in housing 12 on shock absorbing supports, may be any of numerous lamps employed in such instruments, such as for example, a xenon lamp or other suitable source. Suitability for employment in forensic light source 10 is determined by the spectral emission of the lamp. In particular, lamps having sufficiently high spectral output within the desired output range of the instrument are suitable. The exact nature of the xenon lamp or any other suitable lamp is not a feature of this invention. The system also includes a fan 28 may be connected in parallel with lamp 26, whereby actuation of switch 24 results in turning both lamp 26 on and turning fan 28 on, thus providing for the cooling of the unit during use. Fan 28 is mounted adjacent to a port 30 for the circulation of air on the rear of the unit as illustrated in FIG. 4. Port 30 may be a simple circular hole and may be covered by a grille 32 made of wire. Referring back to FIG. 3, because there must be a flow of air through the instrument, a set of vents 34 are provided near the opposite end of housing 12.

In connection with venting it is noted that switch 24 may be made to individually control fan 28 and light source 26. More particularly, if desired, it is also possible for switch 24 to be a three way switch in which the first position has both the fan and the light source off, in a second position sends power only to fan 28 and in a third position sends power to fan 28 and light source 26. This allows the light source to be turned off while still continuing cooling to occur thus preserving the life of the unit.

As illustrated in FIG. 3, the optical system in forensic light source 10 further comprises a reflector 36 position to couple light output from lamp 26 to focusing optics 38. Focusing optics 38 serve to concentrate light directly received from lamp 26 and indirectly received from lamp 26 by a reflector 36 to the output of the system.

A pair of filter wheel 40 and 42 are positioned within a cap housing 44 (FIG. 1). Referring back to FIG. 3 taken in conjunction with FIG. 5, it is seen that the filter wheels, such as filter wheel 40 each have a mounting hole 44 which allows them to be mounted for rotation on a post 46 (FIG. 6). More particularly, both wheels 40 and 42 are mounted on post 46 and maybe be freely rotated to put one or two filters over the output of focusing optics 38 and thus filter such output.

More particularly, light output from focusing optics 38 passes through a hole 48 (FIG. 3) through front wall 50 and then through a filter and filter wheel 40 and a filter and filter wheel 42, or if no filter is selected through holes in either or both wheels 40 and 42.

This may be better understood with reference to FIG. 6 where one filter 52 in filter wheel 40 is positioned in a manner coupled to receive the output of focusing optics 38. Five filters namely filters 52, 54, 56, 58 and 60 in similar fashion wheel 42 has filters 62–70 as illustrated in FIG. 6.

There is an alphanumeric designation 72 associated with each of the filters. Each alphanumeric designation 72 such as designation 72 designates the wavelength of its corresponding filter which is radially opposite the location of the alpha numeric designation. For example, alphanumeric designation 72 is opposite filter 56 whereas alphanumeric designation 74 is located opposite to filter 54. Likewise, another alphanumeric designation 76 is located opposite filter 58 and corresponds to the characteristics of filter 58. In similar fashion alphanumeric designation 74 corresponds to the characteristics of filter 54. Other alphanumeric designations on the system are not illustrated but are positioned in similar analogous fashion.

In accordance with the preferred embodiment, the system, or more particularly, the filter wheels 40 and 42 have holes, such as hole 78 in wheel 40 which do not include any filter and merely pass all light in order to output an uncolored or "white" light output. Hole 78 is a simple hole, in contrast with holes 80 which support the filters. Holes 80 have a suitable shoulder which supports the filter and are closed by a retainer spring ring 82, a plurality of which are employed in the system, each associated with one of the holes 80 in filter wheels 40 and 42, as illustrated in FIG. 5.

Figure 7:
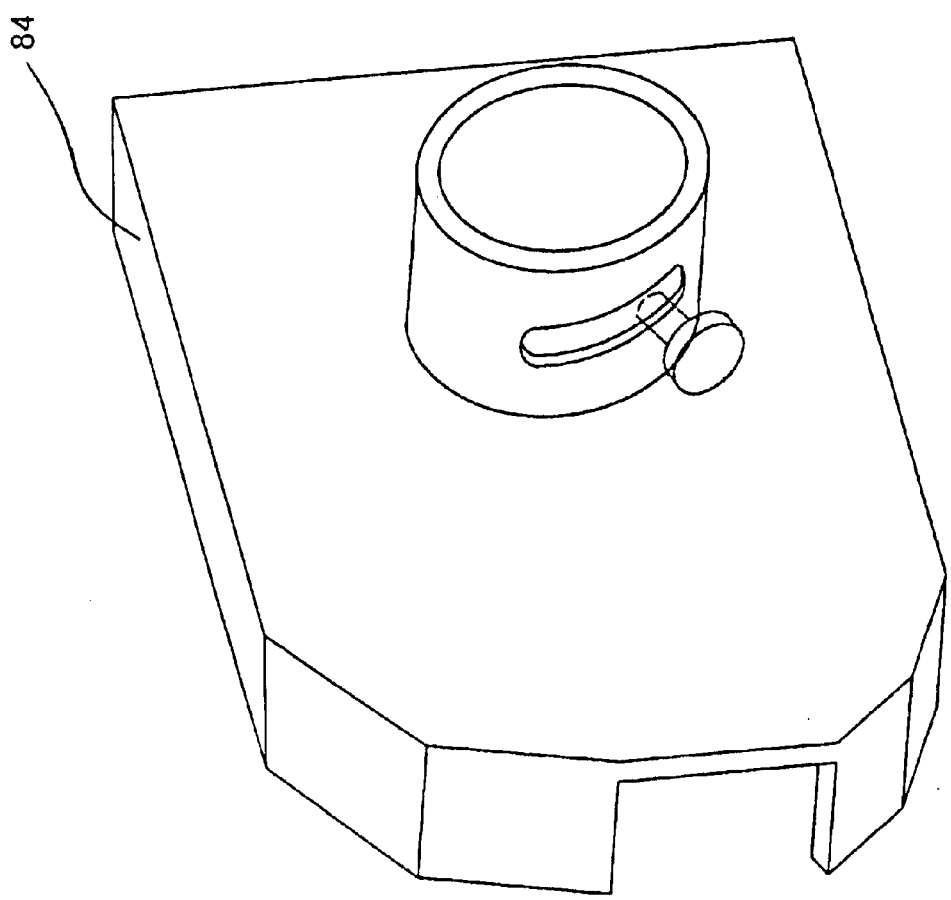
FIG. 7 is an interior view of the front cap piece of the embodiment of the present invention in FIG. 1.

Each of the filter wheels includes a mounting hole 83 upon which filter wheels 40 and 42 are mounted for rotation. The filter wheels are maintained in position after being mounted by a closure cap 84, as shown and positioned in FIG. 2. Closure cap 84 is shown in perspective in FIG. 7.

Figure 5:
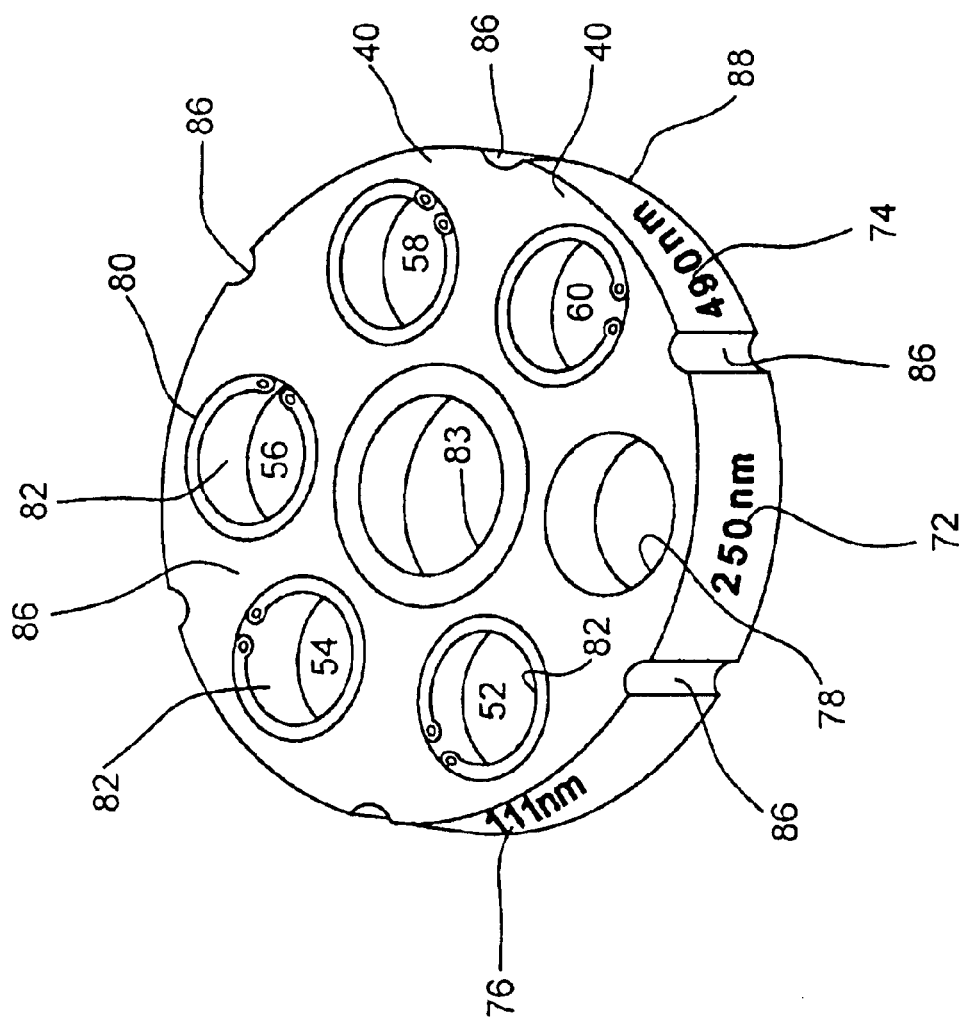
FIG. 5 is a front view of one of the filter wheels useful with the embodiment of the present invention in FIG. 1.
Figure 6:
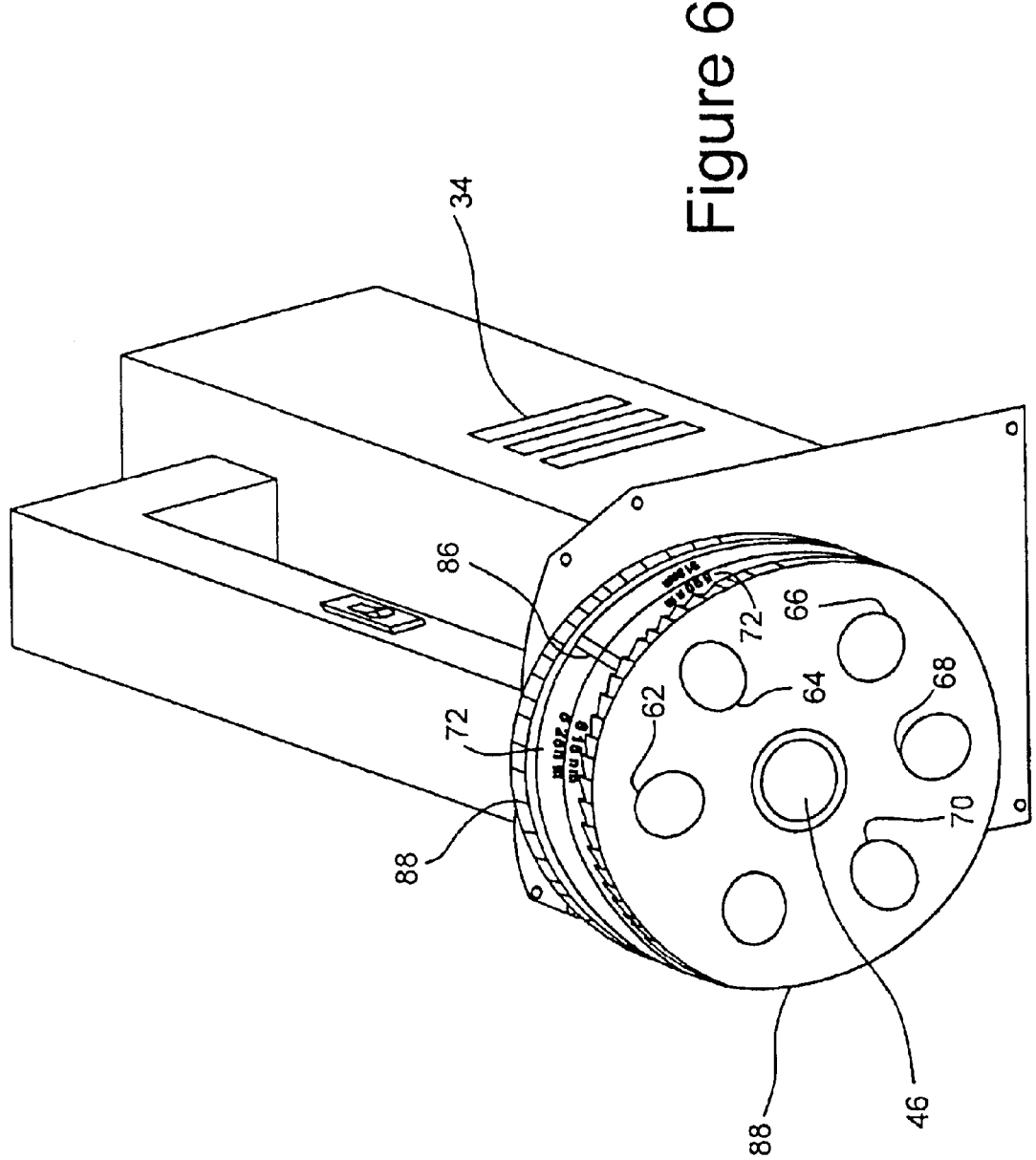
FIG. 6 is a front view taken from above with the front cap piece of the embodiment of the present invention in FIG. 1 removed.

As can be seen in FIGS. 3 and 5, filter wheels 40 and 42 include a plurality of notches 86. Notches 86 serve to provide positive stops so that the filter wheels click into place in one of six specified positions. See also FIG. 6. Filter wheels 40 and 42 may be rotated to any desired position through the use of knurled serrations 88. In accordance with the preferred embodiment of the invention, the output of light source 26 is outputted at a fixed point on housing 12. When hole 78, which has no filter mounted in it, is lined up with the output point, then the unfiltered output spectrum, of the lamp will be output by the system.

This may be better understood with reference to FIG. 6 where it can be seen that filter 52 is overlapping the proper point for lamp 26. See also FIG. 3.

Figure 8:
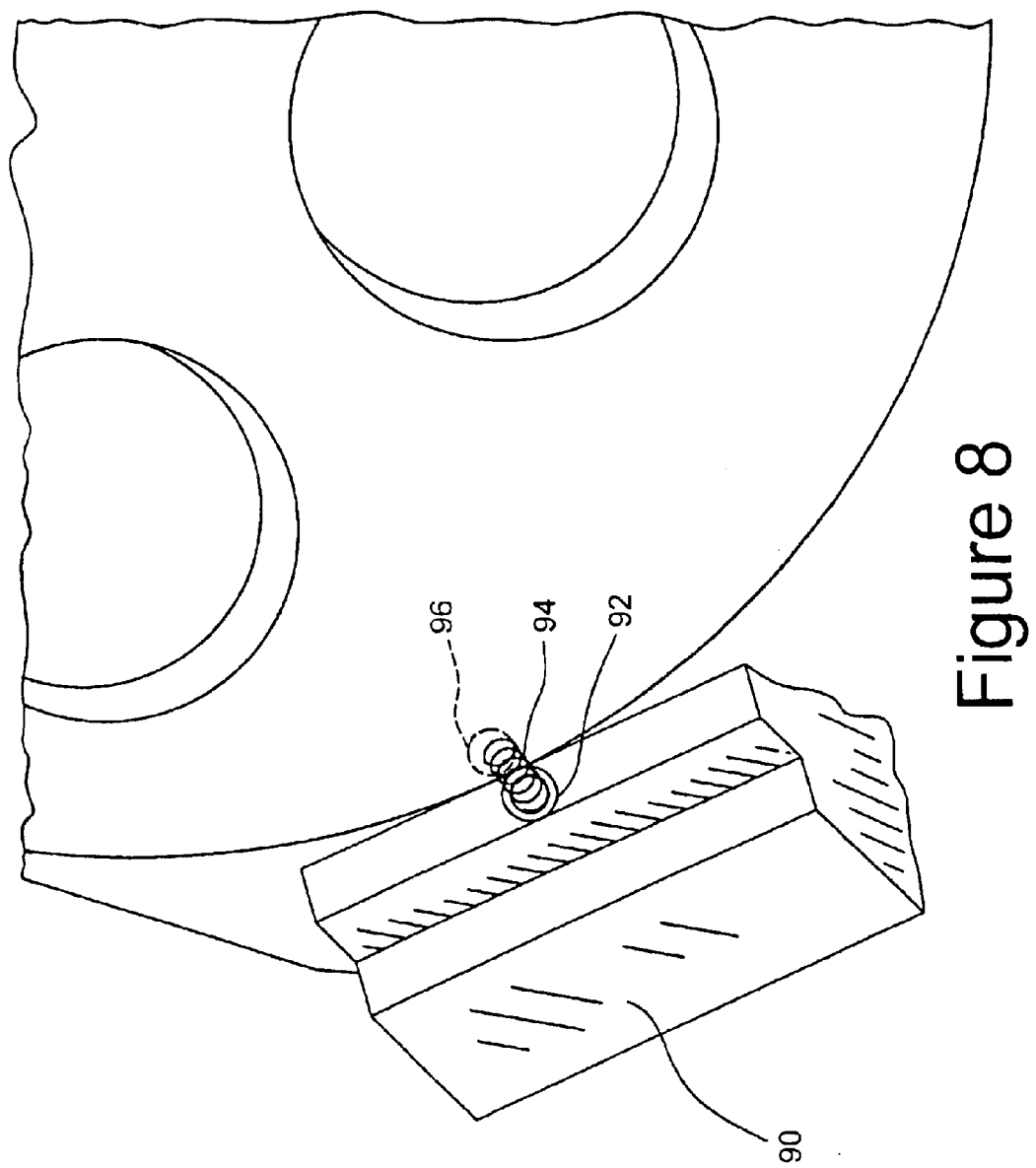
FIG. 8 illustrates a mechanism for retaining the filter wheel in position.
Figure 9:
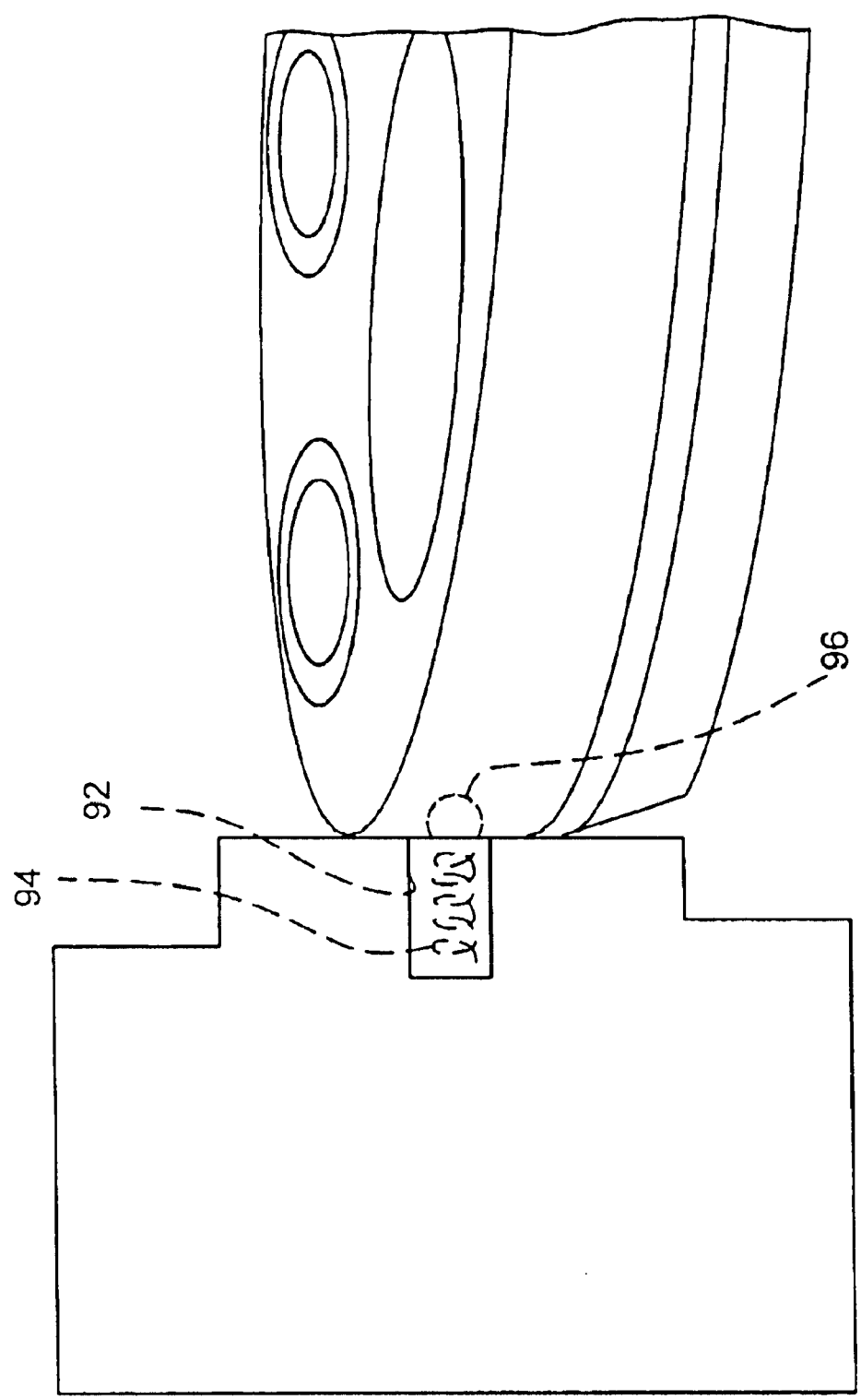
FIG. 9 illustrates a mechanism in FIG. 8 engaging the filter wheel.

In accordance with the preferred embodiment of the invention, positive engagement of the wheel and maintenance of the position of the wheel at the desired preset points is achieved through the use of a mechanism which mates with detense or notches 86. The particular mechanism used in accordance with the present invention is a spring loaded ball bearing. More particularly, as can be seen with reference to FIG. 8 a block 90 includes a hole 92 into which a spring 94 is positioned. A ball bearing is then pressed over spring 94 and into hole 92 and a filter wheel pressed over it to keep it in position. As the filter wheel is rotated, the ball, not illustrated, is forced into one of the detense or notches 86 resulting in holding the filter in the desired position. The result is illustrated in FIG. 9 where a ball 96 is shown in phantom lines.

Figure 10:
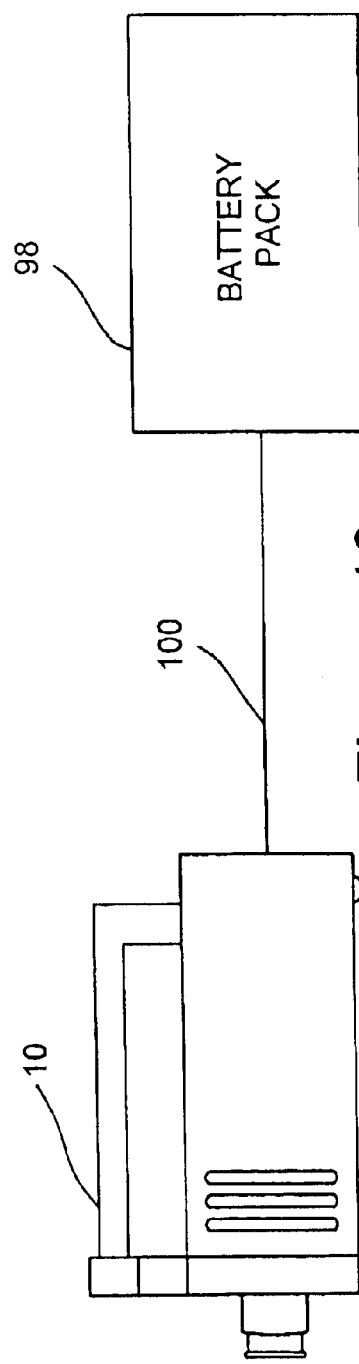
FIG. 10 is a side view of an embodiment of the present invention further illustrating the connection of the light source with a battery pack.
Figure 11:
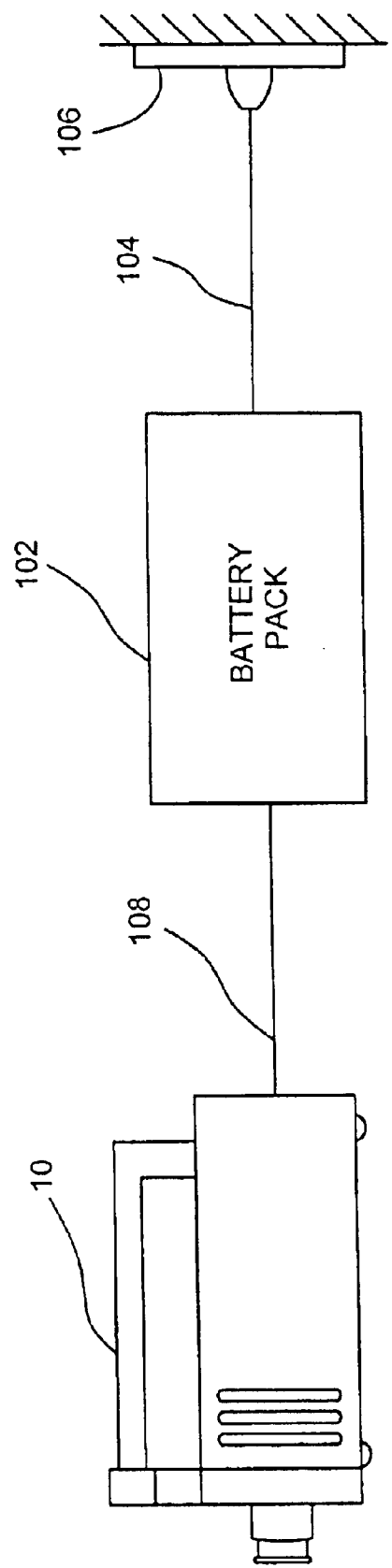
FIG. 11 is a side view of an embodiment of the present invention further illustrating the connection of the light source with a power supply.

In accordance with the present invention, ease of use and light weight is achieved by separating the light unit from the power supply, whether it be a battery pack or an electrical power supply operated by the mains. Such situations are illustrated in FIGS. 10 and 11. Referring first to FIG. 10, a battery powers the system and the power supplied by a battery pack 98 is connected by a five or six foot length of cord 100 to the forensic power source 10. Thus the weight of the battery pack is not a burden to the user, the battery pack being simply put down on the floor or a piece of furniture during use of the inventive system 10.

It is advantageous that the inventive forensic light source 10 also be powered by house current. In this case a power supply 102 is used and power supply 102 may be connected by a length of line cord 104 to house current source 106, as illustrated in FIG. 11. Here again a length of electrical cable 108 perhaps six or eight feet long is used to connect power supply 102 to the ruggedized forensic light source 10.

The separation of the power supply or the battery from the remainder of the system also contributes to the ruggedized nature of the system. More particularly, because the weight of the battery is not connected to the delicate bulb and filter assembly, when the same is dropped the momentum of the system is minimal and the damage caused by the impact is reduced, thus resulting in a more rugged, more hearty and more reliable system under normal police use which may in fact involve substantial abuse.

In accordance with the present invention, filter wheel 40 has an open hole, which passes all light, and a plurality of filters. The filters in filter wheel 40 have the following characteristics: a bandpass filter with a center wavelength of 440 nm with a relatively broad bandwidth in the range of 40 to 50 nm; a bandpass filter with a center wavelength 490 nm with a relatively broad bandwidth in the range of 40 to 50 nm; a bandpass filter with a center wavelength of 540 nm with a relatively broad bandwidth in the range of 40 to 50 nm; a bandpass filter with a center wavelength of 590 nm with a relatively broad bandwidth in the range of 40 to 50 nm; and a short pass filter with a maximum pass wavelength of 540 nm (which functions as a crime scene scanning filter). The 540 nm filter is known as a crime scene scanning filter because it is most useful in searching over wide areas of a crime scene in order to identify areas for inspection under light of various wavelengths. Of course, in accordance with the present invention, it is also contemplated that a crime scene will be searched under white light and under light of various wavelengths, particularly in those areas of the crime scene likely to contain various types of the evidence. In addition, to the extent that it is known that various specific types of evidence are most visible under the light of one wavelength or another, it is anticipated that in accordance with the invention that area will be examined on the light of the applicable wavelength or wavelengths.

Filter wheel 42 also has an open hole, which passes all light, and filters with the following characteristics: a bandpass filter with a center wavelength of 415 nm with a relatively broad bandwidth in the range of 40 to 50 nm; a bandpass filter with a center wavelength of 465 nm with a relatively broad bandwidth in the range of 40–50 nm; a bandpass filter with a center wavelength of 515 nm with a relatively broad bandwidth in the range of 40 to 50 nm; a bandpass filter with a center wavelength of 565 nm with a relatively broad bandwidth in the range of 40 to 50 nm; and a bandpass filter with a center wavelength of 615 nm with a relatively broad bandwidth in the range of 40 to 50 nm.

In accordance with yet another embodiment of the invention, it is contemplated that the system will incorporate a third filter wheel which has a number of very narrow band reject filters. These may be selected to reject wavelengths which excite certain commonly occurring wavelengths which constitute noise and present the possibility of overpowering wavelengths which one wishes to detect or photograph.

Any suitable filters may be used in accordance with the invention, including, filters made by holographic processes, dielectric coating, glass plates coated with layers of materials incorporating dyes, and so forth. While lamps of other power may be used, it is anticipated that the inventive system 10 will be used with a 100 watt lamp.

Figure 12A:
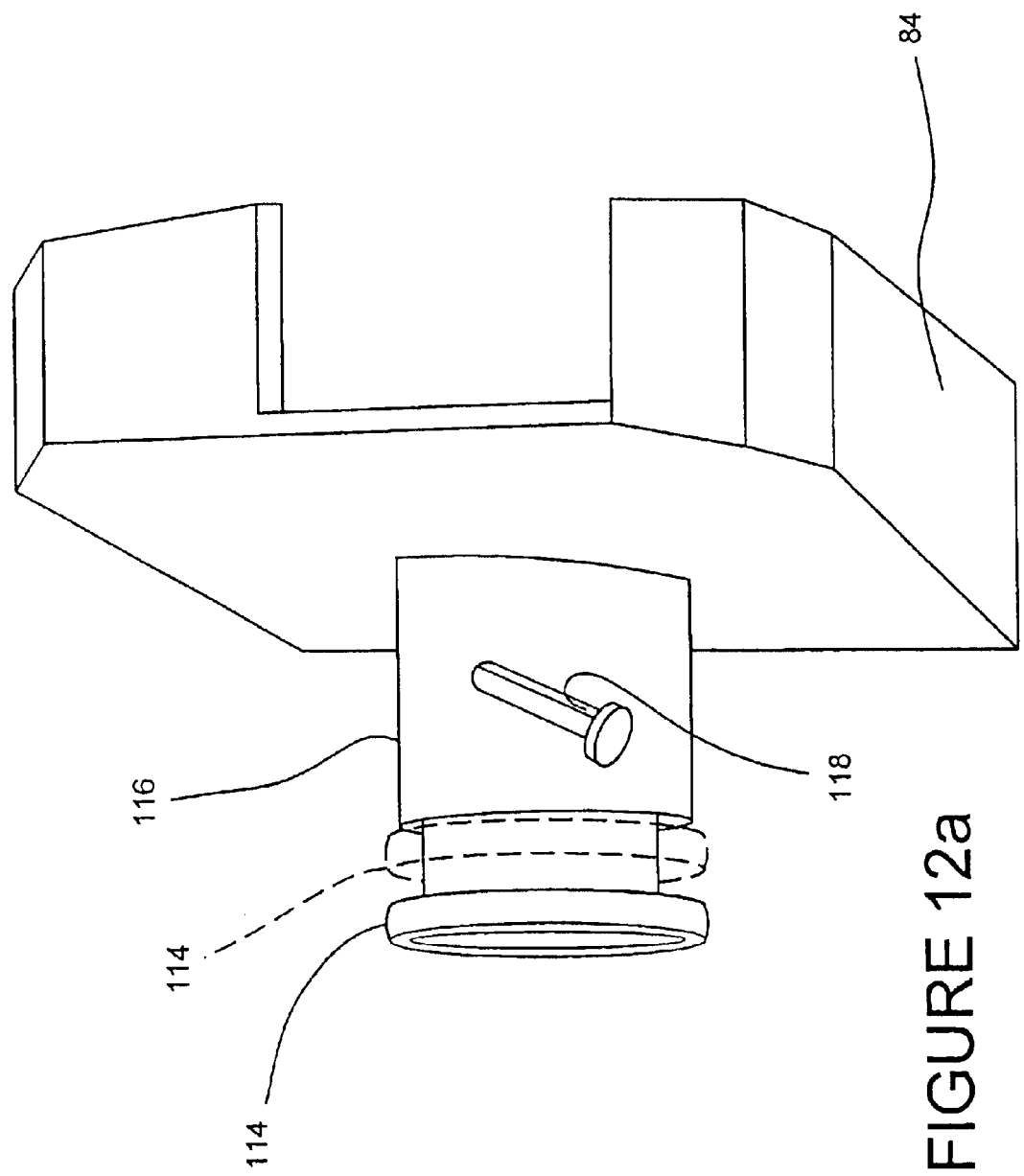
FIG. 12a illustrates a focusing position for the light output focusing lens mounted in a turret which is slidably mounted to a tubular member of the front cap.
Figure 12B:
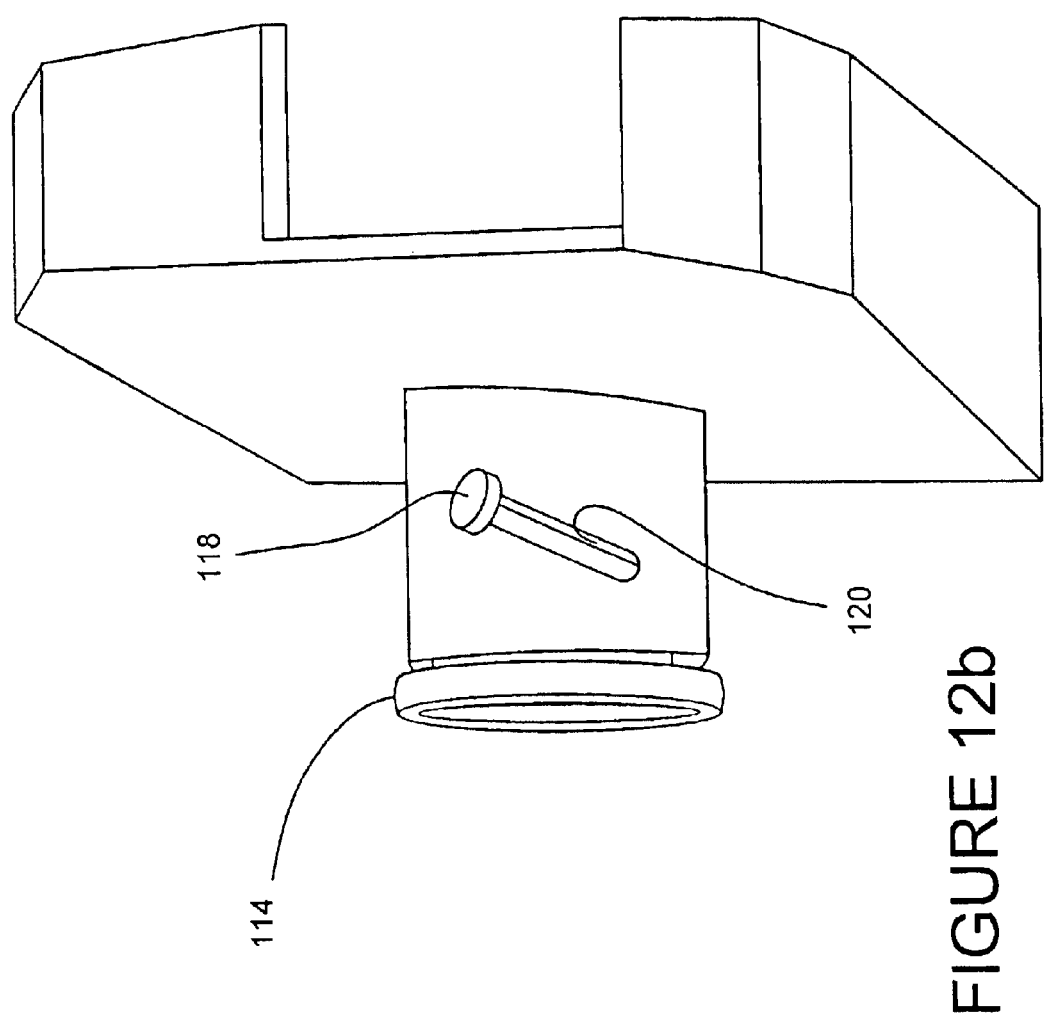
FIG. 12b illustrates a second focusing position for the light output focusing lens, similar to that illustrated in FIG. 12a mounted in a turret which is slidably mounted to a tubular member of the front cap.

It accordance with the invention, it is contemplated that it may be desired to vary the optical characteristics of the light output by the system. The same is achieved to the use of a lens 112 (FIG. 12a), mounted in a turret 114, which is slidably mounted in a tubular member 116 secured to cap 84. Turret 114 may be positioned in various positions as illustrated in 12a and 12b in solid and phantom lines. In particular, a screw 118 which passes through a slot 120 is used to hold turret 114 in position. Rotation of turret 114 causes turret 114 to move into or out of tubular member 116, thus varying the distance between lens 112 and the lamp, and focusing the light into beams having different characteristics. Once adjusted in the desired manner, turret 114 is held in position by tightening screw 118 which mates with a tapered hole in turret 114.

When it is decided to use the inventive system, the power supply 102 or battery pack 98 is put on a table or on the ground at the crime scene. If the power supply is used, the same is plugged into standard house current.

An individual then grasps the light source using his hand 16, as illustrated FIG. 2. The thumb 22 of hand 16 may be used to rotate filter wheel 40 or 42 to put a desired filter or no filter at all into the path of light output from lamp 26.

The user uses light of different wavelengths to inspect the crime scene for materials which will only the revealed by light of a particular wavelength, or which will be revealed in a better and easier to identify fashion by light of a selected wavelength.

Moreover, in accordance with the invention, it is contemplated that filters from both filter wheel 40 and 42 may be used simultaneously in order to have a more selective filtering of wavelengths of light output by lamp 26. For example, if a filter having a center bandwidth of 415 nm is used simultaneously with the filter having a center bandwidth of 440 nm of the other filter wheel, the resultant filtering will have a center wavelength of approximately 427.5 nm and a bandpass characteristic whose largest wavelength is the longest wavelength passed by the 415 nm filter and a shortest wavelength which is the smallest wavelength passed by the 440 nm filter. In this way, inventive system 10, though it incorporates only nine filters, will provide nine wide bandwidth bandpass characteristics (using one of the filters in one of the filter wheels, with the other filter wheels set for an open hole which passes light all wavelengths) and eight narrow bandwidth bandpass characteristics (using combinations of relatively proximate wavelengths from each of the two filter wheels). The above configuration allows for the individual use of nine broadband filters (415 nm, 440 nm, 465 nm, 490 nm, 515 nm, 540 nm, 565 nm, 590 nm, 615 nm), a short pass filter (crime scene scanning filter) and white light for searching the crime scene. Additionally, with the configuration mentioned above, nine additional commercially useful wavelength filtering functions with relatively narrow bandwidth (20 to 25 nm) can be achieved. These narrow bandpass filtering capabilities at intermediate wavelengths are especially useful for photography at a crime scene and in many instances will provide improved contrast photographs. More specifically, using the 415 nm filter of filter wheel 40 and the 440 nm filter of filter wheel 42, one obtains a resultant bandpass with a center wavelength of 427.5 nm; using the 440 nm filter of filter wheel 42 and the 465 nm filter of filter wheel 40, one obtains a resultant bandpass with a center wavelength of 452.5 nm; using the 465 nm filter of filter wheel 40 and the 490 nm filter of filter wheel 42, one obtains a resultant bandpass with a center wavelength of 477.5 nm; using the 490 nm filter of filter wheel 42 and the 515 nm filter of filter wheel 40, one obtains a resultant bandpass with a center wavelength of 502.5 nm; using the 515 nm filter of filter wheel 40 and the 540 nm filter of filter wheel 42, one obtains a resultant bandpass with a center wavelength of 527.5 nm; using the 540 nm filter of filter wheel 42 and the 565 nm filter of filter wheel 40, one obtains a resultant bandpass with a center wavelength of 552.5 nm; using the 565 nm filter of filter wheel 40 and the 590 nm filter of filter wheel 42, one obtains a resultant bandpass with a center wavelength of 577.5 nm; and using the 590 nm filter of filter wheel 42 and the 615 nm filter of filter wheel 40, one obtains a resultant bandpass with a center wavelength of 602.5 nm.

Further, using the 590 nm filter of filter wheel 40 and the crime scene scanning filter of filter wheel 42, one obtains an asymmetrical filtering characteristic that represents the juxtaposition of the two characteristics of the two filters. There is a sharp decline in fluorescence transmission at the high-end while excitation reflection is blocked. This is useful for highly reflective surfaces, such as aluminum.

It is further contemplated that three or more filter wheels may be used in accordance with the present invention. The same may be used to provide an increased number of broad band filters. The use of three or more filter wheels will also provide greater flexibility in making combinations of different filters. These filters may also be used together to achieve an increasingly narrow bandpass filtering. In addition, the use of three or more filter wheels will allow selection of bandpass widths. For example, it may be desired in some cases to combine a 590 nm filter with a 565 nm filter having a first bandwidth while at other times to combine the same 590 nm filter with a 565 nm filter having a second bandwidth, in order to bare the resultant bandwidth. This can be accommodated through the use of additional filter wheels, or filter wheels with greater numbers of filters on them.

In an alternative embodiment, filter wheel 140 has an open hole, which passes all light, and a plurality of filters. The filters in filter wheel 140 have the following characteristics: a bandpass filter with a center wavelength of 415 nm with a broad bandwidth in the range of 40 to 50 nm; a bandpass filter with a center wavelength 440 nm with a broad bandwidth in the range of 40 to 50 nm; a bandpass filter with a center wavelength of 465 nm with a broad bandwidth in the range of 40 to 50 nm; a bandpass filter with a center wavelength of 490 nm with a broad bandwidth in the range of 40 to 50 nm; and a bandpass filter with a center wavelength of 515 nm with a broad bandwidth in the range of 40 to 50 nm. In accordance with this embodiment of the invention, filter wheel 142 also has an open hole, which passes all light, and filters with the following characteristics: a bandpass filter with a center wavelength of 540 nm with a broad bandwidth in the range of 40 to 50 nm; a bandpass filter with a center wavelength of 565 nm with a broad bandwidth in the range of 40 to 50 nm; a bandpass filter with a center wavelength of 590 nm with a broad bandwidth in the range of 40 to 50 nm; a bandpass filter with a center wavelength of 615 nm with a broad bandwidth in the range of 40 to 50 nm; and a short pass filter with a maximum pass wavelength of 540 nm (crime scene scanning filter).

While an illustrative embodiment of the invention has been described, it is, of course, understood that various modifications of the invention will be obvious to those of ordinary skill in the art. Such modifications are within the spirit and scope of the invention which is limited and defined only by the appended claims.

We claim:

1. A forensic light source comprising:
   (a) a housing;
   (b) a light source contained within said housing, said light source having a light output;
   (c) a power supply coupled to said light source;
   (d) a first filter support member adjustably and movably mounted on said housing, said first filter support member comprising
      (i) a plurality of first filter receiving supports, and
      (ii) a plurality of first light bandpass filters, each of said first light bandpass filters with an associated bandpass range, each of said first light bandpass filters positioned in one of said first filter receiving supports, said first filter support member being adjustable to position any one of said first light filters to receive said light output and to filter said light output to produce a filtered light output and transmit said filtered light output; and
   (e) a second filter support member adjustably and movably mounted on said housing, said second filter support member comprising
      (i) a plurality of second filter receiving supports, and
      (ii) a plurality of second light bandpass filters, each of said second light bandpass filters with an associated bandpass range, each of said second light bandpass filters positioned in one of said second filter receiving supports, said second filter support member being adjustable to position any one of said second light filters to receive said filtered light output and to filter said filtered light output to produce a twice filtered light output and transmit said twice filtered light output, said first bandpass light filters having wavelength bandpass characteristics which cooperate with wavelength bandpass characteristics of said second bandpass light filters to form additional bandpass ranges when a filter on said first filter support member is used with a filter on said second filter support member.

2. A light source as in claim 1 wherein said light source further comprises a handle secured to said housing, said handle being positioned and configured to be held by one hand and said the first and second filter support members being positioned to be adjusted by the thumb of said one hand.

3. A light source as in claim 1 further comprising a fan, and wherein said housing has at least one opening for air intake by said fan, and at least one opening for air exhaust by said fan.

4. A light source as in claim 1 further comprising focusing optics, said focusing optics dimensioned and configured to allow the user to focus light from said light source.

5. A light source as in claim 4 wherein said focusing optics comprises a lens mounted within a tubular member, said tubular member slidably mounted on a second tubular member, said second tubular member being integral with said housing, said focusing optics being maintained in focus by a friction fitting.

6. A light source as in claim 4 further comprising a reflective member, positioned to be coupled to said light source to direct said light source output toward said focusing optics.

7. A light source as in claim 1 wherein said housing is a shock resistant housing and further comprising a handle configured and dimensioned to be held by less then the user's full hand.

8. A light source as in claim 1 wherein said power supply is an external battery pack.

9. A light source as in claim 1 wherein said power supply is an external transformer and connection to a standard household power supply.

10. A light source as in claim 1 wherein said light source is a 100 watt bulb.

11. A light source as in claim 1 wherein at least one of said filter support members comprises a rotatably mounted light filtering wheel which defines a hole which does not contain a filter to allow light to be passed through said hole without being filtered.

12. A light source as in claim 3 further comprising a power control switch, said power control switch turning on said fan and said light source simultaneously.

13. A light source as in claim 3, further comprising a power control switch, said power control switch turning on said fan and said light source independently.

14. A light source as in claim 3 further comprising a power control switch, said power control switch having settings which turn the light and fan on simultaneously, turn the fan while keeping the light off, and keep the light and fan off.

15. A ruggedized forensic light source comprising:
(a) a housing, said housing comprising a shock resistant support, said housing having at least one opening for air intake and at least one opening for air exhaust, said shock resistant housing further comprising a handle configured and dimensioned to be held by less than a user's full hand;
(b) a light source mounted within said housing on said shock resistant support, said light source having an output;
(c) at least one filter wheel mounted in front of said light source output, said filter wheel comprising a plurality of light filters, and a section devoid of a light filter to allow light to be passed through said filter wheel without being filtered, said filter wheel being mounted for rotation and positioned, dimensioned and configured to be adjusted by the user's thumb while the user grasps said handle with his remaining fingers;
(d) focusing optics positioned to focus light from said light source; and
(e) a reflective member, functionally coupled to said light source to direct at least a portion of said light source output toward said focusing optics.

16. A light source as in claim 15 wherein said focusing optics comprises a lens, mounted within a tubular member, said tubular member slidably mounted on a second tubular member, said second tubular member being secured to said shock resistant housing, said focusing optics being kept in the position, to which it has been slidably moved, by a friction fitting.

17. A light source as in claim 15, further comprising a fan, an external power supply; and a power control switch coupled to said light source, said fan and said power supply to supply power from said power supply to said light source and/or said fan when activated by the user, wherein said power supply is an external battery pack.

18. A light source as in claim 15, further comprising a fan, an external power supply; and a power control switch coupled to said light source, said fan and said power supply to supply power from said power supply to said light source and/or said fan when activated by the user, wherein said power supply is an external transformer and a connection device for coupling to a standard household power source.

19. A light source as in claim 15, further comprising a fan, an external power supply; and a power control switch coupled to said light source, said fan and said power supply to supply power from said power supply to said light source and/or said fan when activated by the user, wherein said power control switch turns on said fan and said light source simultaneously.

20. A light source as in claim 15, further comprising a fan, an external power supply; and a power control switch coupled to said light source, said fan and said power supply to supply power from said power supply to said light source and/or said fan when activated by the user, wherein said power control switch turns on said fan and said light independently.

21. A light source as in claim 15, further comprising a fan, an external power supply; and a power control switch coupled to said light source, said fan and said power supply to supply power from said power supply to said light source and/or said fan when activated by the user, wherein said power control switch has settings for turning the light and fan on, for turning the fan on and keeping the light off, and keeping the light and fan off.

22. A light source as in claim 1 wherein said first and second filter support members are light wheels and said filters are bandpass filters, said filters being arranged such that their wavelengths, when arranged in a sequential order, are alternately placed on said first wheel and then said second wheel.

23. A light source as in claim 22 wherein the selection of one filter on said first wheel and the selection of a second filter on said second wheel results in a bandpass narrower than the bandpass of said one filter or said second filter, the combined characteristic of said one filter and said second filter being formed by the juxtaposition of the characteristics of said one filter and said second filter and a bandpass wavelength range between said one and said second filters, and a narrower bandwidth than either said one or said second filters.

24. A light source as in claim 22, wherein said two filter wheels comprise, a first wheel and a second wheel, each of said filter wheels comprising a plurality of bandpass filters, said filters being arranged such that their wavelengths, when arranged in a sequential order, are alternately placed between said first wheel and said second wheel, said filters having bandwidths which allow them to be combined with filters on the other filter wheel.

25. A light source as in claim 24, further comprising a third filter wheel holding a plurality of additional filters.

26. A light source as in claim 25, wherein said additional filters are band reject filters.

27. A ruggedized forensic light source comprising:
(a) a shock resistant housing;
(b) a light source contained within said housing, said light source having a light output;
(c) a power supply coupled to said light source;
(d) a power control switch coupled to said light source and said power supply, said power control switch configured and dimensioned to supply power from said power supply to said light source when activated by the user; and
(e) at least one filter wheel comprising a plurality of filters mounted in front of said light source output to filter said light output, said filter wheel comprising a plurality of light wavelength responsive filters, said filter wheel being mounted for rotation and positioned, dimensioned and configured to be adjusted by a user's thumb while the user grasps said handle with his remaining fingers.

28. A forensic light source comprising:
(a) a housing;
(b) a light source contained within said housing, said light source having a light output;
(c) an external power supply located outside said housing coupled to said light source;
(d) a power control switch coupled to said light source and said power supply, said power control switch configured and dimensioned to supply power from said power supply to said light source when activated by the user; and
(e) at least one filter wheel comprising a plurality of filters mounted in front of said light source output to filter said light output, said filter wheel comprising a plurality of wave length bandpass filters, said filter wheel being mounted for rotation and positioned, dimensioned and configured to be adjusted by a user's thumb while the user grasps said handle with his remaining fingers.

29. A forensic light source comprising:
(a) a housing;
(b) a light source contained within said housing, said light source having a light output;
(c) a power supply coupled to said light source;
(d) a first filter support member adjustably and movably mounted on said housing, said first filter support member comprising (i) first, second, and a third filter receiving supports, and (ii) first, second and third wavelength bandpass filters positioned in said first, second and third filter receiving supports respectively, said first filter support member being adjustable to position any one of said first, second and third wavelength bandpass filters to receive said light output and to filter said light output to produce a filtered light output and transmit said filtered light output, said first filter support member being mounted for rotation and positioned, dimensioned and configured to be adjusted by a user's thumb while the user grasps said handle with his remaining fingers; and
(e) a second filter support member adjustably and movably mounted on said housing, said second filter support member comprising (i) fourth and fifth filter receiving supports, and (ii) fourth and fifth bandpass filters positioned in said fourth and fifth filter receiving supports, said second filter support member being adjustable to position any one of said fourth and fifth wavelength bandpass filters to receive said filtered light output and to filter said filtered light output to produce a twice filtered light output and transmit said twice filtered light output, said first filter passing wavelengths greater than wavelengths passed said second filter, said second filter passing wavelengths greater than wavelengths passed said third filter, said third filter passing wavelength greater than wavelengths passed said fourth filter, and said fourth filter passing wavelength greater than wavelengths passed by said fifth filter, said second filter support member being mounted for rotation and positioned, dimensioned and configured to be adjusted by the user's thumb while the user grasps said handle with his remaining fingers.

30. A forensic light source comprising:
(a) a housing having at least one opening for air intake and at least one opening for air exhaust said housing further comprising a handle configured and dimensioned to be held by less than a user's full hand;
(b) a light source mounted within said housing, said light source having an output;
(c) two filter wheels mounted in front of said light source output, said filter wheels each comprising a plurality of light filters, and at least one of said filter wheels including a section devoid of a light filter to allow light to be passed through said filter wheel without being filtered, said filter wheels being mounted for rotation and positioned, dimensioned and configured to be adjusted by the user's thumb while the user grasps said handle with his remaining fingers;
(d) focusing optics positioned to focus light from said light source; and
(e) a reflective member, functionally coupled to said light source to direct at least a portion of said light source output toward said focusing optics.

* * * * *